US012293864B2

(12) United States Patent
Okuzawa et al.

(10) Patent No.: US 12,293,864 B2
(45) Date of Patent: May 6, 2025

(54) COIL COMPONENT AND MANUFACTURING METHOD THEREFOR

(71) Applicant: TDK Corporation, Tokyo (JP)

(72) Inventors: Nobuyuki Okuzawa, Tokyo (JP); Kazuhiko Ito, Tokyo (JP); Munehiro Takaku, Tokyo (JP); Junichiro Urabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 757 days.

(21) Appl. No.: 17/504,330

(22) Filed: Oct. 18, 2021

(65) Prior Publication Data

US 2022/0130595 A1 Apr. 28, 2022

(30) Foreign Application Priority Data

Oct. 23, 2020 (JP) ................................ 2020-177881

(51) Int. Cl.
*H01F 27/28* (2006.01)
*H01F 5/00* (2006.01)
(Continued)

(52) U.S. Cl.
CPC ......... *H01F 27/2823* (2013.01); *H01F 5/003* (2013.01); *H01F 17/0006* (2013.01);
(Continued)

(58) Field of Classification Search
CPC .. H01F 17/02; H01F 2017/004; H01F 37/005; H01F 5/003; H01F 17/0006;
(Continued)

(56) References Cited

U.S. PATENT DOCUMENTS 6,303,971 B1 * 10/2001 Rhee ........................ H01L 27/08 257/E21.022
10,475,877 B1 * 11/2019 Hsu ......................... H01L 24/81
(Continued)

FOREIGN PATENT DOCUMENTS

CN 108389706 A * 8/2018 ............. G06F 30/20
JP S5246787 A 4/1977
(Continued)

OTHER PUBLICATIONS

Office Action issued in the corresponding Japanese patent Application No. 2020-177881 dated Jan. 30, 2024, w/ English Translation.

*Primary Examiner* — Tszfung J Chan
(74) *Attorney, Agent, or Firm* — Rimon P.C.

(57) ABSTRACT

Disclosed herein is a coil component that includes a coil pattern embedded in an element body and helically wound in a plurality of turns. The element body includes a support body having a cavity formed therein and a first insulating layer stacked on the support body so as to cover the cavity, thereby forming a hollow space inside the element body. The coil pattern includes a plurality of first sections formed along an inner wall of the cavity and a plurality of second sections formed on the first insulating layer. One ends of the plurality of first sections are connected respectively to their corresponding one ends of the plurality of second sections. The other ends of the plurality of first sections are connected respectively to their corresponding other ends of the plurality of second sections.

6 Claims, 9 Drawing Sheets

(51) Int. Cl.

| | |
|---|---|
| ***H01F 17/00*** | (2006.01) |
| ***H01F 17/02*** | (2006.01) |
| ***H01F 27/29*** | (2006.01) |
| ***H01F 27/32*** | (2006.01) |
| ***H01F 41/12*** | (2006.01) |

(52) U.S. Cl.

CPC ........... *H01F 17/02* (2013.01); *H01F 27/292* (2013.01); *H01F 27/327* (2013.01); *H01F 41/127* (2013.01); *H01F 2017/004* (2013.01)

(58) Field of Classification Search

CPC ............. H01F 17/0013; H01F 27/2804; H01F 2027/2809; H01F 17/0033; H01F 27/2823; H01F 27/292; H01L 28/10; H01L 23/5227; H01L 23/645

USPC .................................. 336/200, 232; 257/531

See application file for complete search history.

(56) References Cited

U.S. PATENT DOCUMENTS

| | | | | |
|---|---|---|---|---|
| 2002/0008301 | A1* | 1/2002 | Liou | H01L 27/08 257/E21.022 |
| 2007/0230049 | A1* | 10/2007 | Fujiwara | H01F 17/0013 360/123.01 |
| 2008/0173976 | A1* | 7/2008 | Stamper | H01L 23/5227 257/E21.022 |
| 2016/0069750 | A1* | 3/2016 | Annis | H01F 27/402 374/163 |
| 2016/0379747 | A1* | 12/2016 | Wolter | H01L 23/5227 336/200 |
| 2017/0098606 | A1* | 4/2017 | Lu | H01L 23/53295 |
| 2017/0352467 | A1* | 12/2017 | Kakiuchi | H01F 17/0013 |
| 2018/0096778 | A1 | 4/2018 | Yatabe et al. | |

FOREIGN PATENT DOCUMENTS

| | | | | | |
|---|---|---|---|---|---|
| JP | 04302406 | A | * | 10/1992 | |
| JP | H04302406 | A | | 10/1992 | |
| JP | 2005244084 | A | * | 9/2005 | |
| JP | 2006-324489 | A | | 11/2006 | |
| JP | 2008-198923 | A | | 8/2008 | |
| JP | 2018-61008 | A | | 4/2018 | |
| JP | 2018061008 | A | * | 4/2018 | H01F 17/00 |

* cited by examiner

COIL COMPONENT AND MANUFACTURING METHOD THEREFOR

BACKGROUND OF THE INVENTION

Field of the Invention

The present invention relates to a coil component and a manufacturing method therefor and, more particularly, to a coil component having a structure in which a helical coil pattern is embedded in an element body and a manufacturing method therefor.

Description of Related Art

As a coil component having a structure in which a helical coil pattern is embedded in an element body, a coil component described in JP 2006-324489A is known.

However, in the coil component described in JP 2006-324489A, it is difficult to obtain sufficiently high self-resonance frequency (SRF).

SUMMARY

It is therefore an object of the present invention to achieve high self-resonance frequency in a coli component having a structure in which a helical coil pattern is embedded in an element body.

A coil component according to the present invention includes: an element body; a coil pattern embedded in the element body and helically wound in a plurality of turns; and first and second terminal electrodes provided on the surface of the element body and connected respectively to one and the other ends of the coil pattern. The element body includes a support body having a cavity formed therein and a first insulating layer stacked on the support body so as to cover the cavity, thereby forming a hollow space inside the element body. The coil pattern includes a plurality of first sections formed along the inner wall of the cavity and a plurality of second sections formed on the first insulating layer. One ends of the plurality of first sections are connected respectively to their corresponding one ends of the plurality of second sections, and the other ends of the plurality of first sections are connected respectively to their corresponding other ends of the plurality of second sections.

According to the present invention, most of the inner diameter area of the coil pattern is constituted by the hollow space, so that the floating capacitance generated between adjacent turns of the coil pattern can significantly be reduced, which in turn can achieve high self-resonance frequency.

In the present invention, the element body may further include a second insulating layer that covers the inner wall of the cavity, and the first sections of the coil pattern may be provided on the inner wall of the cavity through the second insulating layer. This allows a conductive material to be used as the material of the support body. In this case, the support body may be made of silicon. This facilitates the formation of the cavity.

In the present invention, the first insulating layer may be made of a resin-based insulating material. Thus, the first insulating layer has flexibility, so that a part thereof that covers the hollow space is less likely to break even when applied with an external force. In this case, the resin-based insulating material constituting the first insulating layer may be added with filler. This can increase the strength of the first insulating layer.

In the present invention, the element body may further include a third insulating layer made of a resin-based insulating material and covering the first insulating layer so as to embed the plurality of second sections therein, the first and second terminal electrodes may be provided on the third insulating layer, and the resin-based insulating material constituting the third insulating layer may be lower in relative permittivity than the resin-based insulating material constituting the first insulating layer. This can reduce the floating capacitance generated between the first and second terminal electrodes and the coil pattern.

In the present invention, the first and second terminal electrodes may be arranged along the axial direction of the coil pattern. This reduces a potential difference between the first and second terminal electrodes and the coil pattern, thereby further reducing floating capacitance.

In this case, the first and second terminal electrodes may be formed on the surface of the element body parallel to the axial direction without being formed on the surface thereof perpendicular to the axial direction. This makes magnetic flux less likely to interfere with the first and second terminal electrodes, thereby suppressing the occurrence of an eddy current.

A coil component manufacturing method according to the present invention includes a first step of forming a cavity in a support body; a second step of forming a plurality of first sections of a coil pattern along the inner wall of the cavity; a third step of forming a hollow space by covering the cavity with a first insulating layer; a fourth step of exposing one and the other ends of each of the plurality of first sections by forming openings in the first insulating layer; and a fifth step of forming a plurality of second sections of the coil pattern on the first insulating layer so as to connect one ends of the plurality of first sections and their corresponding one ends of the plurality of second sections and to connect the other ends of the plurality of first sections and their corresponding other ends of the plurality of second sections.

According to the present invention, it is possible to easily manufacture a coil component having a coil pattern whose inner diameter area is mostly occupied by a hollow space.

The coil component manufacturing method according to the present invention may further include, after the first step and before the second step, a step of forming a second insulating layer that covers the inner wall of the cavity. This allows a conductive material to be used as the material of the support body.

The coil component manufacturing method according to the present invention may further include: a sixth step of forming a third insulating layer made of a resin-based insulating material so as to embed the plurality of second sections therein; and a seventh step of forming, on the third insulating layer, first and second terminal electrodes connected respectively to one and the other ends of the coil pattern. The first insulating layer may be made of a resin-based insulating material, and the resin-based insulating material constituting the third insulating layer may be lower in relative permittivity than the resin-based insulating material constituting the first insulating layer. This can reduce the floating capacitance generated between the first and second terminal electrodes and the coil pattern.

According to the present invention, it is possible to obtain high self-resonance frequency in a coli component having a structure in which a helical coil pattern is embedded in an element body.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a view as viewed from the top surface side, and FIG. 1B is a view as viewed from the mounting surface side;

FIGS. 5A to 9C are process views for explaining the manufacturing method for the coil component 1, where FIGS. 5A, 6A, 7A, 8A, and 9A are schematic perspective views, FIGS. 5C, 6C, 7C, 8C, and 9C are schematic yz cross-sectional views.

DETAILED DESCRIPTION OF THE EMBODIMENTS

Preferred embodiments of the present disclosure will be explained below in detail with reference to the accompanying drawings.

First Embodiment

Figure 1A:
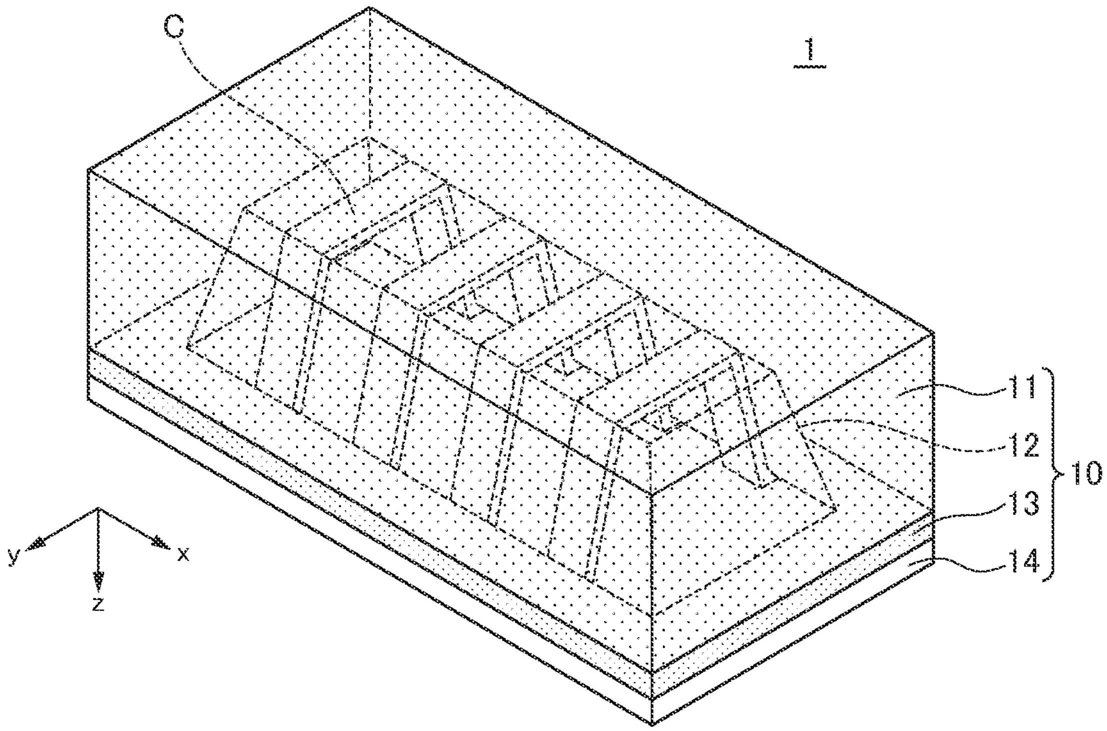
FIGS. 1A and 1B are schematic transparent perspective views for explaining the configuration of a coil component 1 according to a first embodiment of the present invention, where
Figure 1B:
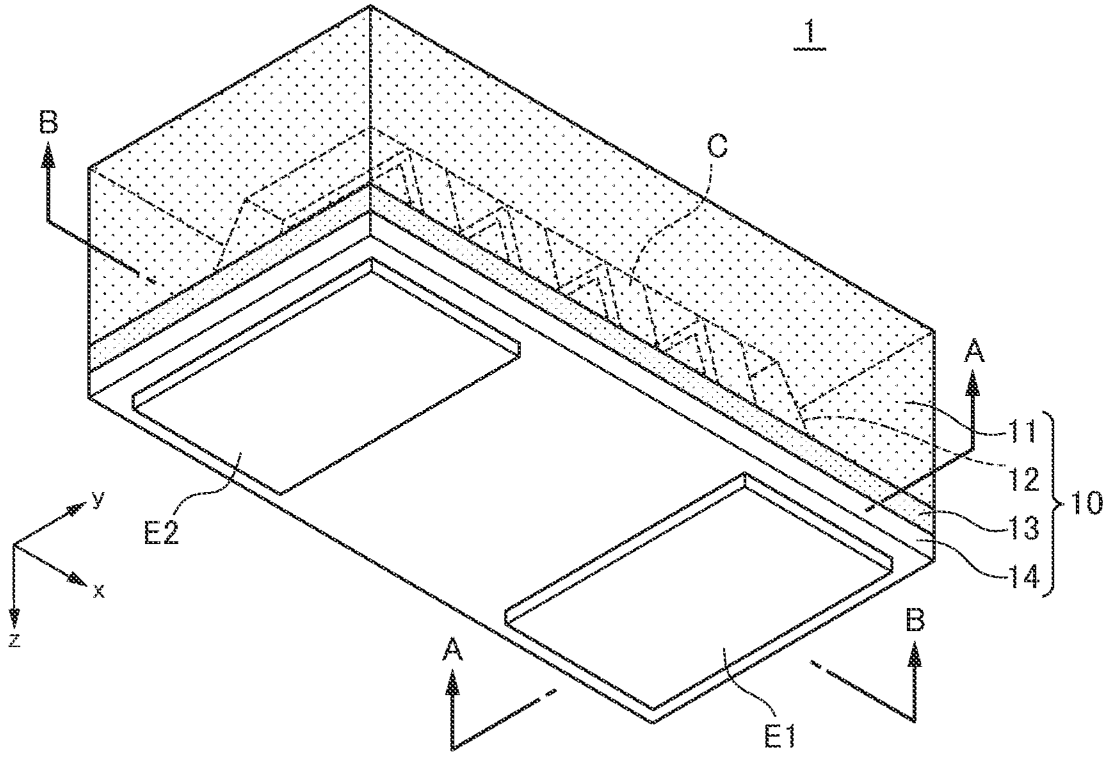
Figure 2A:
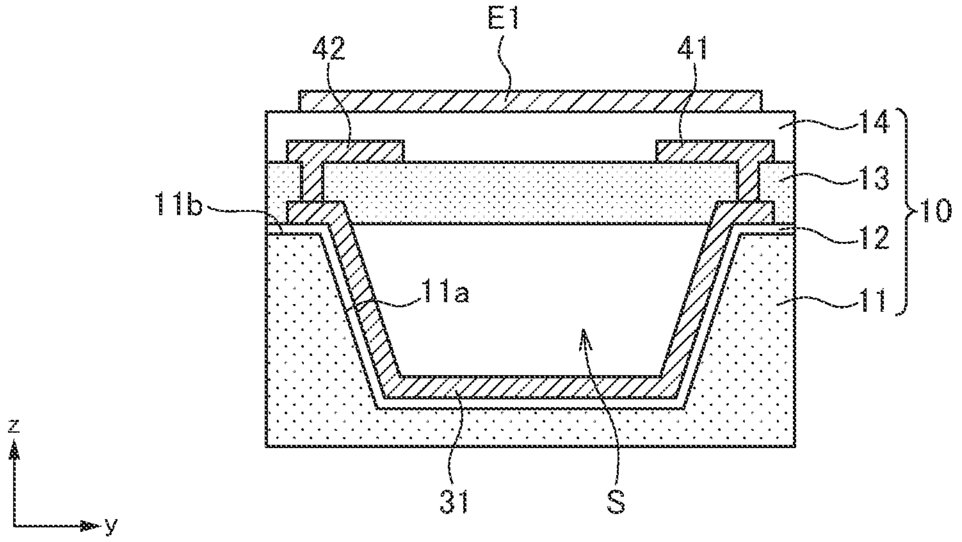
FIG. 2A is a schematic cross-sectional view taken along the line A-A in FIG. 1B.
Figure 2B:
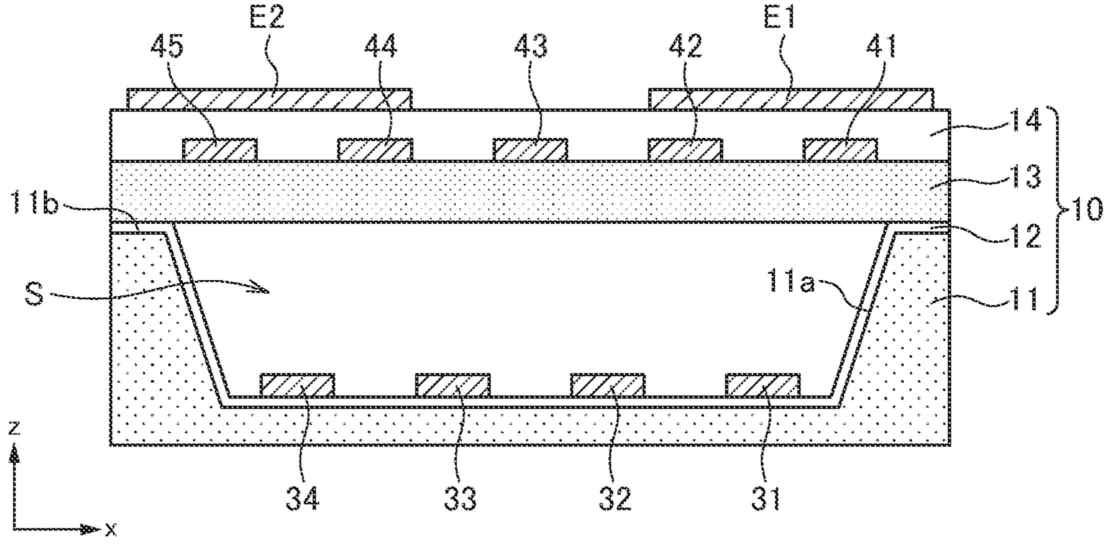
FIG. 2B is a schematic cross-sectional view taken along the line B-B in FIG. 1B.

FIGS. 1A and 1B are schematic transparent perspective views for explaining the configuration of a coil component 1 according to a first embodiment of the present invention. FIG. 1A is a view as viewed from the top surface side, and FIG. 1B is a view as viewed from the mounting surface side. FIG. 2A is a schematic cross-sectional view taken along the line A-A in FIG. 1B, and FIG. 2B is a schematic cross-sectional view taken along the line B-B in FIG. 1B.

The coil component 1 according to the first embodiment is a surface-mountable chip-type electronic component and includes, as illustrated in FIGS. 1A, 1B, 2A, and 2B, an element body 10, a coil pattern C embedded in the element body 10, and terminal electrodes E1 and E2 provided on the surface of the element body 10.

The element body 10 includes a support body 11 and insulating layers 12 to 14. The support body 11 is made of a material having sufficient mechanical strength, such as silicon and has a cavity extending in the xy plane and having a depth in the z-direction. The surface of the support body 11 has an inner wall 11*a* of the cavity and an outer peripheral surface 11*b* surrounding the cavity. The inner wall 11*a* of the cavity has a bottom surface constituting the xy plane and a taper surface positioned between the bottom surface and the outer peripheral surface 11*b*. The taper surface forms an area whose depth linearly changes with a change in the x-direction position or y-direction position. Providing such a taper surface facilitates the formation of a first section (to be described later) of the coil pattern C. The outer peripheral surface 11*b* has a ring shape and constitutes the xy plane.

The insulating layer 12 is a thin film covering the inner wall 11*a* of the cavity and the outer peripheral surface 11*b* thereof and is made of, e.g., silicon. The insulating layer 12 need not necessarily be provided in the present invention; however, when a conductive material, such as silicon, is used as the material for the support body 11, the insulating layer 12 is required to insulate the support body 11 and the coil pattern C from each other.

The insulating layer 13 is made of a resin-based insulating material bonded onto the outer peripheral surface 11*b* of the support body 11 so as to cover the cavity. The insulating layer 13 does not contact the inner wall 11*a* of the cavity, with the result that a hollow space S is formed inside the element body 10 by the support body 11 and insulating layer 13. The hollow space S is filled with air, and thus a relative permittivity E of the hollow space S is about 1. The hollow space S may be filled with inert gas such as nitrogen gas, whereby it is possible to suppress oxidation of the coil pattern C exposed to the hollow space S. The insulating layer 14 is stacked on the surface of the insulating layer 13. The insulating layer 13 is made of a resin-based insulating material obtained by adding filler such as silica to an epoxy- or acrylic-based resin material. On the other hand, the insulating layer 14 is made of a resin material including no filler, such as bismaleimide or liquid crystal polymer.

As described above, the insulating layer 13 is made of a resin-based insulating material having high strength but being flexible, so that even the insulating layer 13 is bonded to the outer peripheral surface 11*b* of the support body 11 to form the hollow space S, it is less likely to break due to an external force. On the other hand, the resin-based insulating material constituting the insulating layer 14 is a resinous material having a low relative permittivity and added with no filler such as silica and is thus lower in relative permittivity than the resin-based insulating material constituting the insulating layer 13. For example, the relative permittivity E of the resin-based insulating material constituting the insulating layer 13 at 1 GHz is about 3.3, and the relative permittivity E of the resin-based insulating material constituting the insulating layer 14 at 1 GHz is about 2.4.

Figure 3:
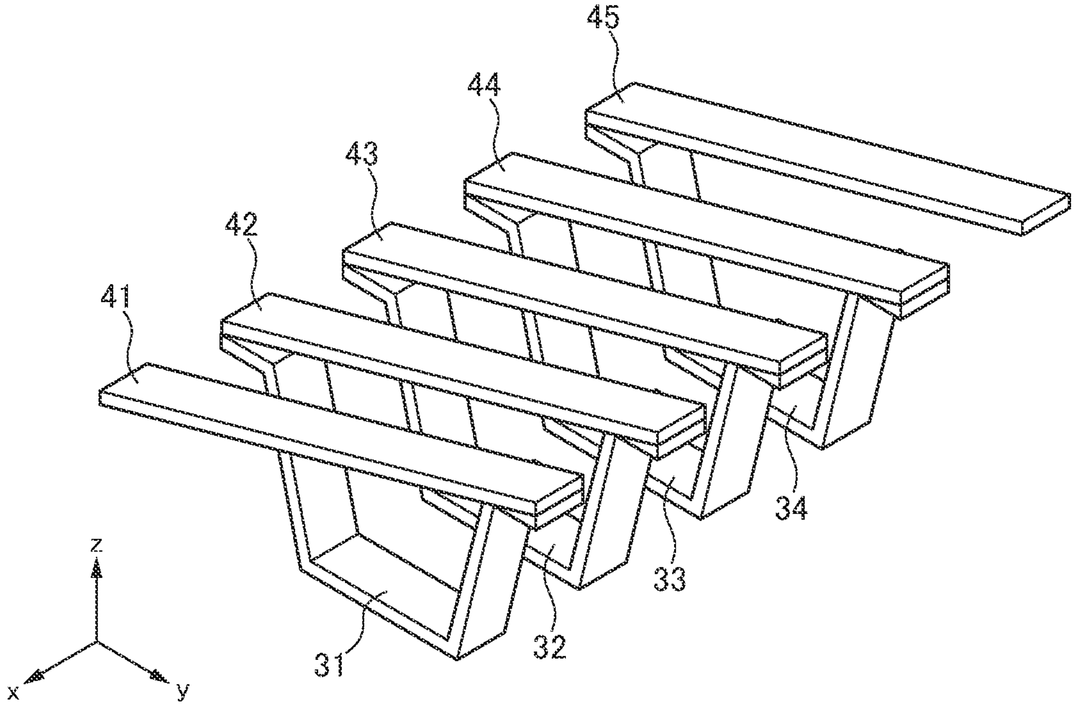
FIG. 3 is a schematic perspective view for explaining the structure of the coil pattern C embedded in the element body 10.
Figure 4:
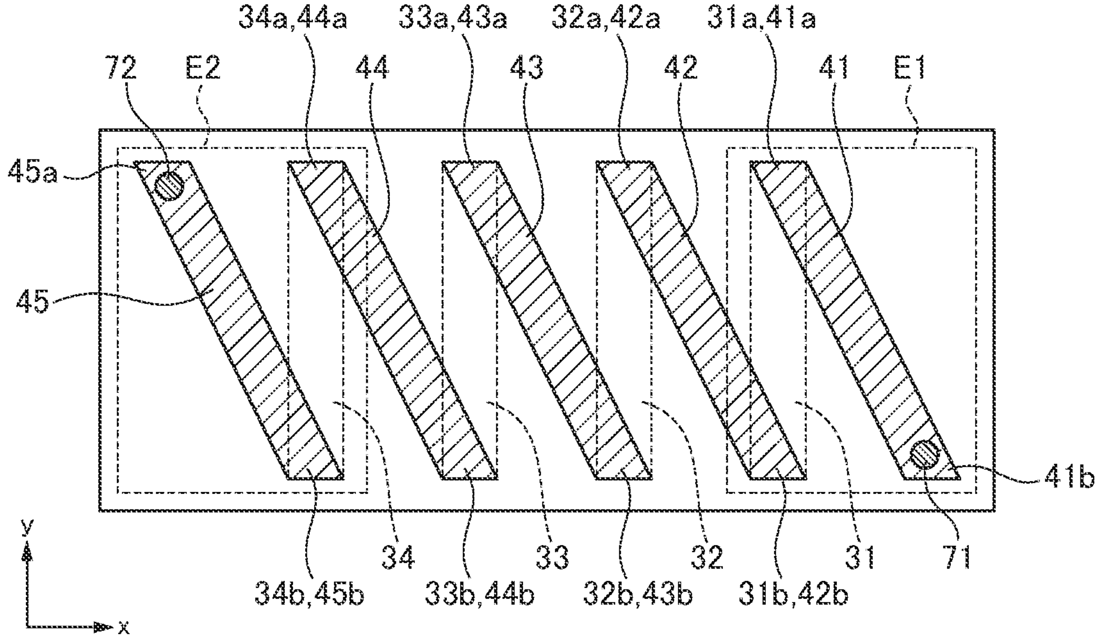
FIG. 4 is a schematic transparent plan view of the coil pattern C as viewed in the z-direction.

FIG. 3 is a schematic perspective view for explaining the structure of the coil pattern C embedded in the element body 10. FIG. 4 is a schematic transparent plan view of the coil pattern C as viewed in the z-direction.

As illustrated in FIGS. 2A, 2B, 3 and 4, the coil pattern C is constituted of first sections 31 to 34 disposed on the support body 11 through the insulating layer 12 and second sections 41 to 45 disposed on the insulating layer 13. One ends 31*a* to 34*a* of the first sections 31 to 34 are connected respectively to one ends 41*a* to 44*a* of the second sections 41 to 44, and the other ends 31*b* to 34*b* of the first sections 31 to 34 are connected respectively to the other ends 42*b* to 45*b* of the second sections 42 to 45. As illustrated in FIGS. 2A and 2B, a part of each of the first sections 31 to 34 that is formed on the inner wall 11*a* of the cavity is exposed to the hollow space S, and the second sections 41 to 45 are embedded in the insulating layer 14. Since the relative permittivity E of the hollow space S is about 1, the floating capacitance between the first sections 31 to 34 adjacent to one another in the x-direction is significantly reduced. Further, since the second sections 41 to 45 are embedded in the insulating layer 14 having a low relative permittivity, the floating capacitance between the second sections 41 to 45 adjacent to one another in the x-direction is also reduced.

With the above configuration, the coil pattern C helically wound in a plurality of turns can be obtained. The coil pattern C has a coil axis extending in the x-direction. The other end 41*b* of the second section 41 constitutes one end of the coil pattern C and is connected to the terminal electrode E1 through a via conductor 71 penetrating the insulating layer 14. One end 45*a* of the second section 45 constitutes the other end of the coil pattern C and is connected to the terminal electrode E2 through a via conductor 72 penetrating the insulating layer 14. The terminal electrodes E1 and E2 are each a bottom-surface terminal formed only on the xy surface of the element body 10. That is, the terminal electrodes E1 and E2 do not cover the yz surface of the element body 10, so that when the coil component 1 is mounted on a circuit board using a solder, the yz surface of the element body 10 is not covered with solder fillets. This can achieve an improved mounting density. Further, magnetic flux generated from the coil pattern C is made less likely to interfere with the terminal electrodes E1, E2 and solder, making it possible to suppress the occurrence of an eddy current.

As illustrated in FIG. 4, the terminal electrode E1 overlaps at least the second section 41, and the terminal electrode E2 overlaps at least the second section 45. Thus, floating capacitance is generated between the terminal electrode E1 and the second section 41 and between the terminal electrode E2 and the second section 45. However, in the present embodiment, the insulating layer 14 positioned both therebetween is made of a resin-based insulating material having a low relative permittivity, making it possible to reduce the floating capacitance generated between the terminal electrode E1, E2 and the second sections 41 and 45. In addition, the second sections 41 to 45 are embedded in the insulating layer 14, so that the floating capacitance between the second sections 41 to 45 adjacent to one another in the x-direction, that is, the floating capacitance generated between adjacent turns of the coil pattern C can be reduced. This makes it possible to prevent a reduction in a self-resonance frequency due to floating capacitance.

Further, in the present embodiment, the terminal electrode E1 also overlaps a part of the second section 42, and the terminal electrode E2 also overlaps a part of the second section 44. Thus, floating capacitance is also generated between the terminal electrode E1 and the second section 42 and between the terminal electrode E2 and the second section 44. The second section 42 has a longer wiring distance from the terminal electrode E1 than the second section 41, so that the floating capacitance of the terminal electrode E1 and second section 42 per unit area is larger than the floating capacitance of the terminal electrode E1 and second section 41 per unit area due to the influence of a voltage drop. Similarly, the second section 44 has a longer wiring distance from the terminal electrode E2 than the second section 45, so that the floating capacitance of the terminal electrode E2 and second section 44 per unit area is larger than the floating capacitance of the terminal electrode E2 and second section 45 per unit area due to the influence of a voltage drop. When the terminal electrodes E1 and E2 each thus overlap some of the second sections 41 to 45, the effect of the use of a resin-based insulating material having a low relative permittivity as the material of the insulating layer 14 becomes larger.

As described above, in the coil component 1 according to the present embodiment, since a part of each of the first sections 31 to 34 that is formed on the inner wall 11*a* of the cavity is exposed to the hollow space S, the floating capacitance between the first sections 31 to 34 adjacent to one another in the x-direction is significantly reduced. Further, since the second sections 41 to 45 are embedded in the insulating layer 14 having a low relative permittivity, the floating capacitance between the second sections 41 to 45 adjacent to one another in the x-direction is also reduced. This can significantly reduce the floating capacitance between adjacent turns of the coil pattern C, making it possible to obtain high self-resonance frequency.

In addition, in the present embodiment, the support body 11 is made of a material having high strength, such as silicon, so that it is possible to prevent a reduction in a self-resonance frequency due to floating capacitance while ensuring the mechanical strength of the element body 10.

Further, in the present embodiment, the terminal electrodes E1 and E2 are arranged in the axial direction (x-direction) of the coil pattern C, so that the terminal electrode E1 does not overlap the second sections (e.g., second sections 44 and 45) having a comparatively longer wiring distance therefrom and, similarly, the terminal electrode E2 does not overlap the second sections (e.g., second sections 41 and 42) having a comparatively longer wiring distance therefrom. This reduces the potential difference between the terminal electrodes E1, E2 and the second sections 41, 42, 44, and 45 overlapping the terminal electrodes E1, E2, so that it is possible to further reduce floating capacitance as compared with a case where the terminal electrodes E1 and E2 are arranged in the direction.

The following describes a manufacturing method for the coil component 1 according to the present embodiment.

FIGS. 5A to 9C are process views for explaining the manufacturing method for the coil component 1 according to the present embodiment. FIGS. 5A, 6A, 7A, 8A, and 9A are schematic perspective views, FIGS. 5B, 6B, 7B, 8B, and 9B are schematic plan views, and FIGS. 5C, 6C, 7C, 8C, and 9C are schematic yz cross-sectional views.

Figure 5A:
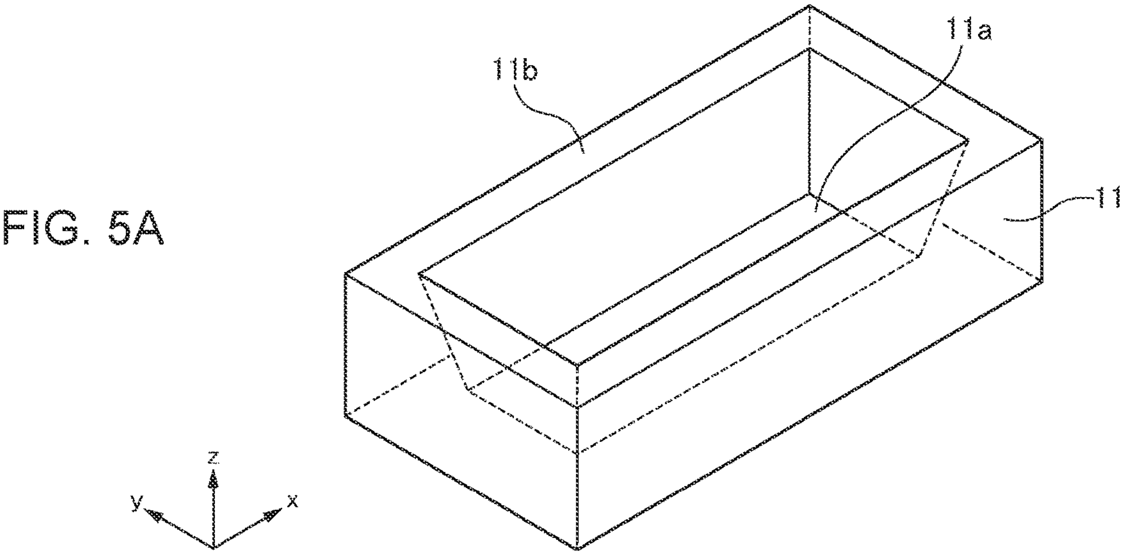
Figure 5B:
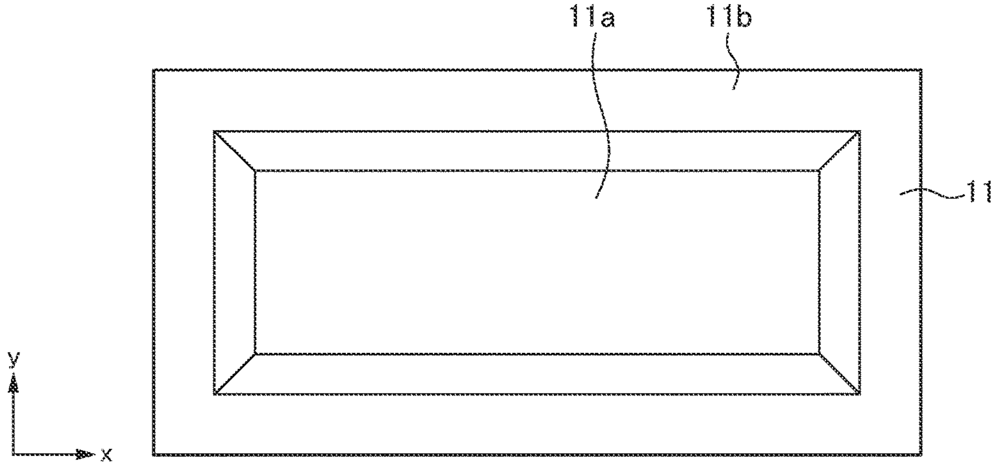
FIGS. 5B, 6B, 7B, 8B, and 9B are schematic plan views.
Figure 5C:
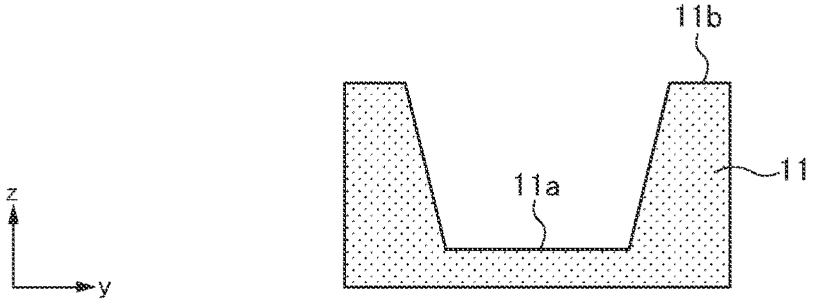
Figure 6A:
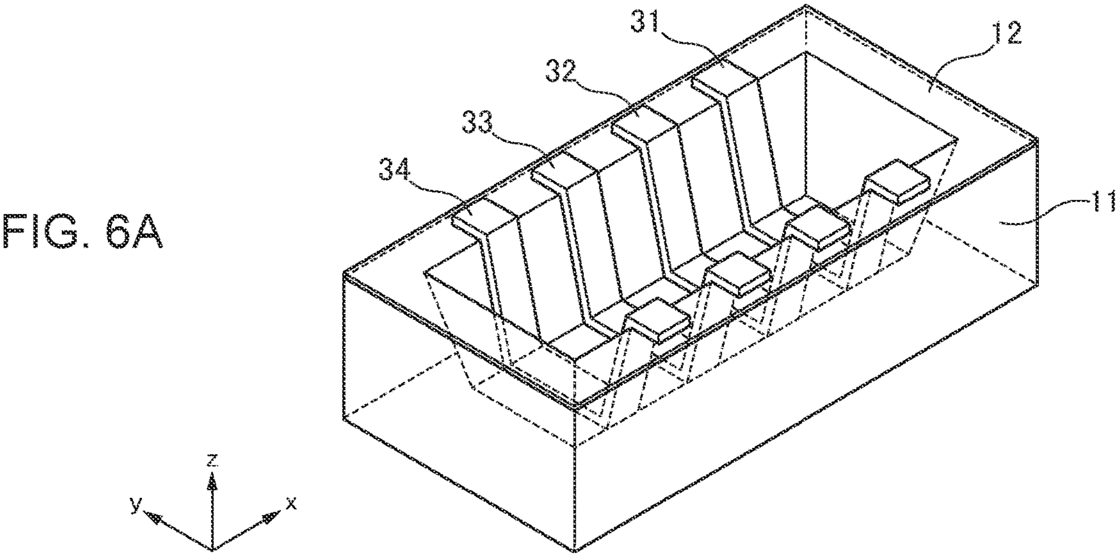
Figure 6B:
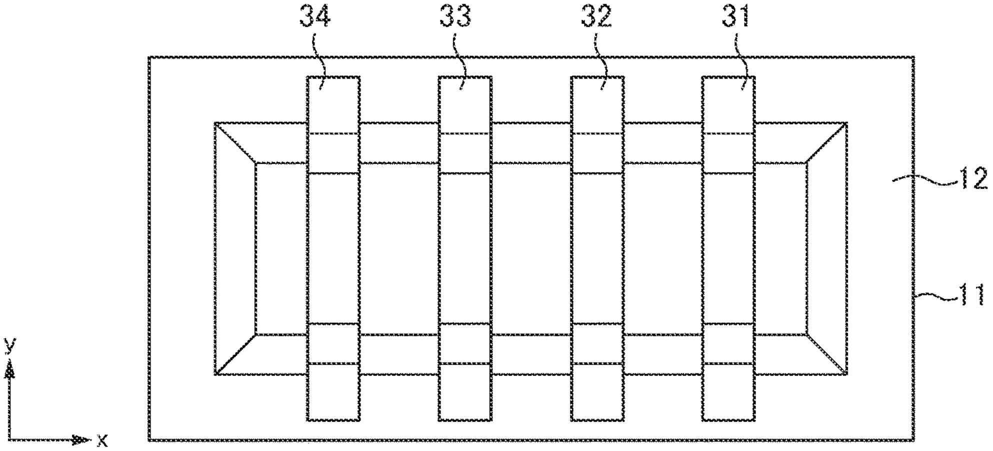
Figure 6C:
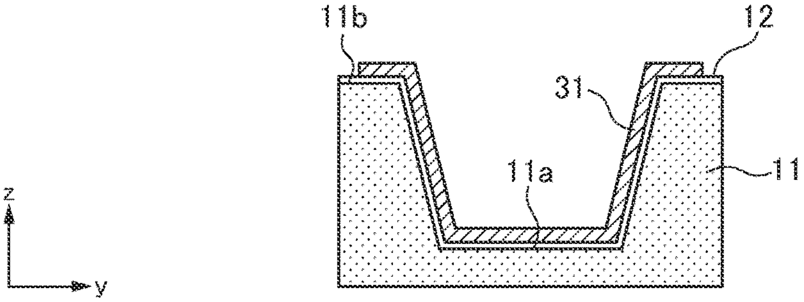

As illustrated in FIGS. 5A to 5C, a support body 11 made of silicon or the like is prepared, and a cavity having a depth in the z-direction is formed using an RIE method. As a result, the inner wall 11*a* is formed so as to correspond to the cavity, and the ring-shaped outer peripheral surface 11*b* is formed around the cavity. Using silicon as the material of the support body 11 allows the formation of the cavity with high accuracy. The angle of the taper surface of the inner wall 11*a* can be adjusted by RIE conditions.

Then, the insulating layer 12 made of silicon oxide is formed on the inner wall 11*a* and the outer peripheral surface 11*b*, and the first sections 31 to 34 of the coil pattern C are formed on the surface of the insulating layer 12. The first sections 31 to 34 are mostly formed so as to cover the inner wall 11*a* of the cavity, and both ends of each of the first sections 31 to 34 are formed so as to cover the outer peripheral surface 11*b*. The first sections 31 to 34 are formed as follows: forming a thin feeding film on the entire surface of the insulating layer 12; applying a photosensitive resist using a spray method, followed by exposure and development, to form openings in the photosensitive resist; and growing the first sections 31 to 34 in the respective openings by electrolyte plating. As a result, the first sections 31 to 34 each crossing the cavity in the y-direction are formed. Since the cavity has the taper surface, breakage and film thickness variation are less likely to occur in the first sections 31 to 34.

Figure 7A:
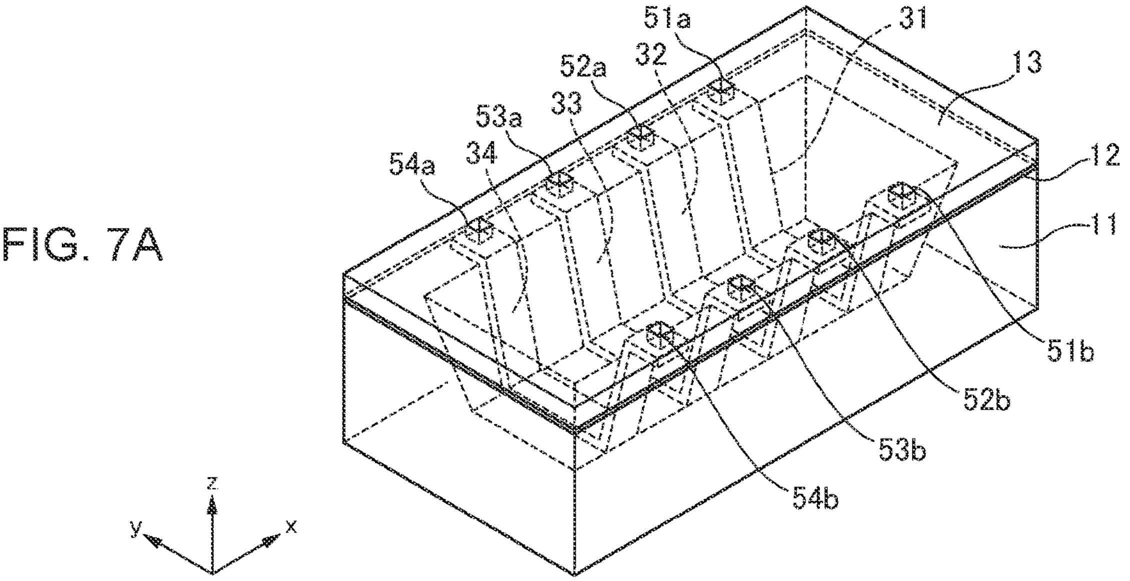
Figure 7B:
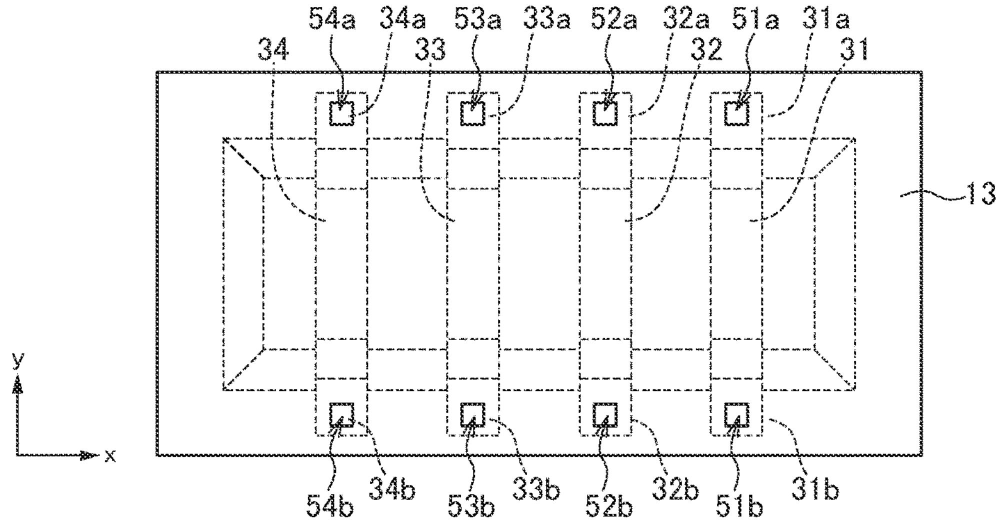
Figure 7C:
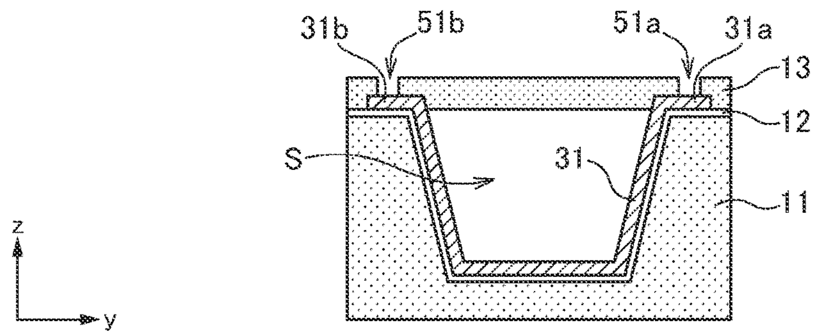

Then, as illustrated in FIGS. 7A to 7C, the insulating layer 13 having a film shape is bonded to the outer peripheral surface 11*b* of the support body 11 through the insulating layer 12. As a result, the cavity is closed to form the hollow space S. The above process may be performed in an environment of inert gas such as nitrogen gas. This allows the hollow space S to be filled with inert gas such as nitrogen gas. The end portions 31*a* to 34*a* and 31*b* to 34*b* of the first sections 31 to 34 that are formed on the outer peripheral surface 11*b* are embedded in the insulating layer 13. Then, the insulating layer 13 are exposed and developed to form openings 51a to 54a and 51b to 54b in the insulating layer 13. The openings 51a to 54a are formed so as to expose the one ends 31a to 34a of the first sections 31 to 34, respectively, and the openings 51b to 54b are formed so as to expose the other ends 31b to 34b of the first sections 31 to 34, respectively. Since the insulating layer 13 is made of a resin-based material by adding filler to a resin material having comparatively high strength, high processability can be achieved.

Figure 8A:
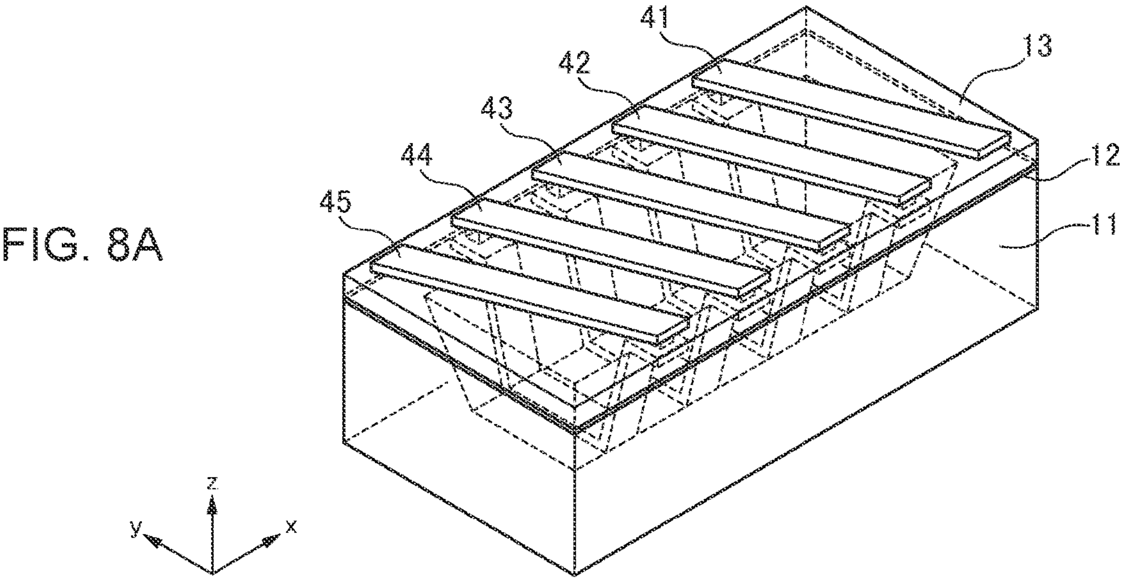
Figure 8B:
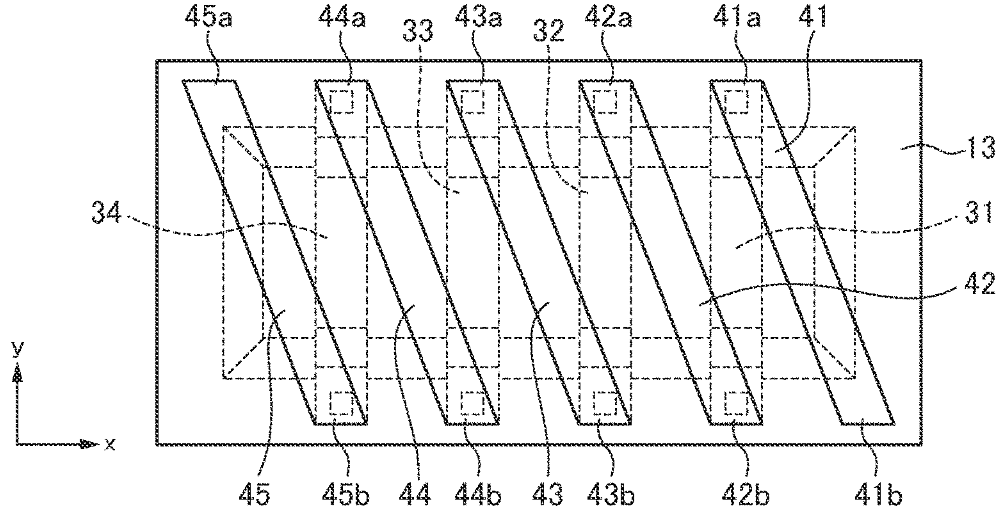
Figure 8C:
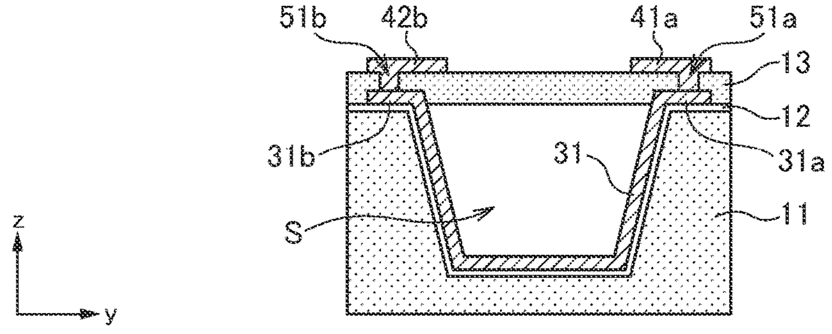

Then, as illustrated in FIGS. 8A to 8C, the second sections 41 to 45 are formed on the surface of the insulating layer 13. The second sections 41 to 45 are formed as follows: forming a thin feeding film on the entire surface of the insulating layer 13; bonding a photosensitive film thereon, followed by exposure and development, to form openings in the photosensitive film; and growing the second sections 41 to 45 in the respective openings by electrolyte plating. The one ends 41a to 44a of the second sections 41 to 44 are formed so as to overlap the openings 51a to 54a, respectively, and the other ends 42b to 45b of the second sections 42 to 45 are formed so as to overlap the openings 51b to 54b. As a result, the one ends 31a to 34a of the first sections 31 to 34 are connected respectively to the one ends 41a to 44a of the sections 41 to 44, and the other ends 31b to 34b of the first sections 31 to 34 are connected respectively to the other ends 42b to 45b of the second sections 42 to 45.

Figure 9A:
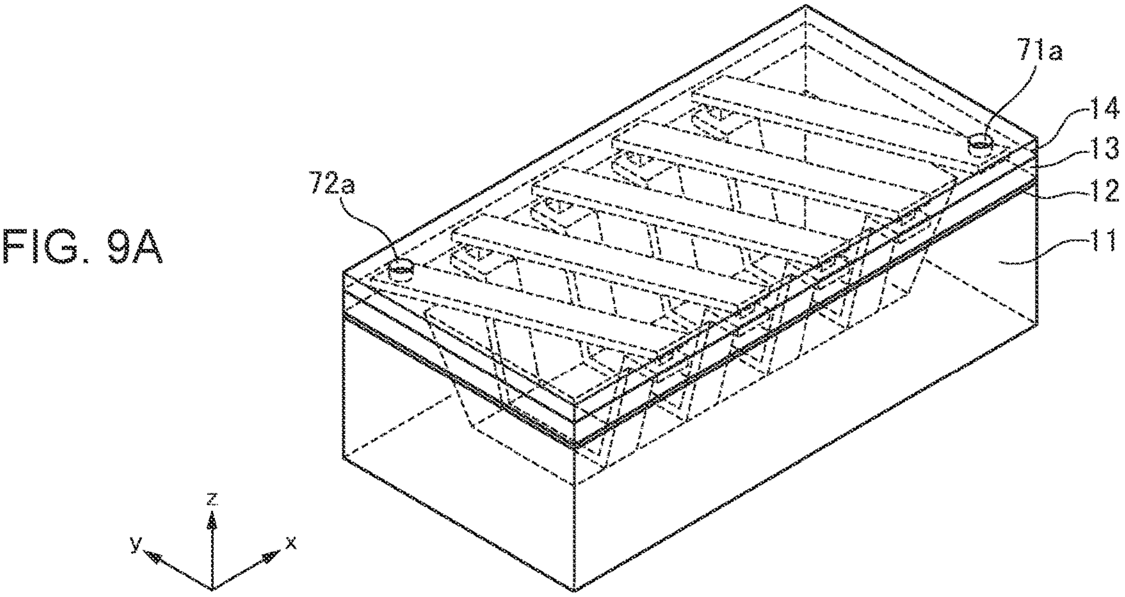
Figure 9B:
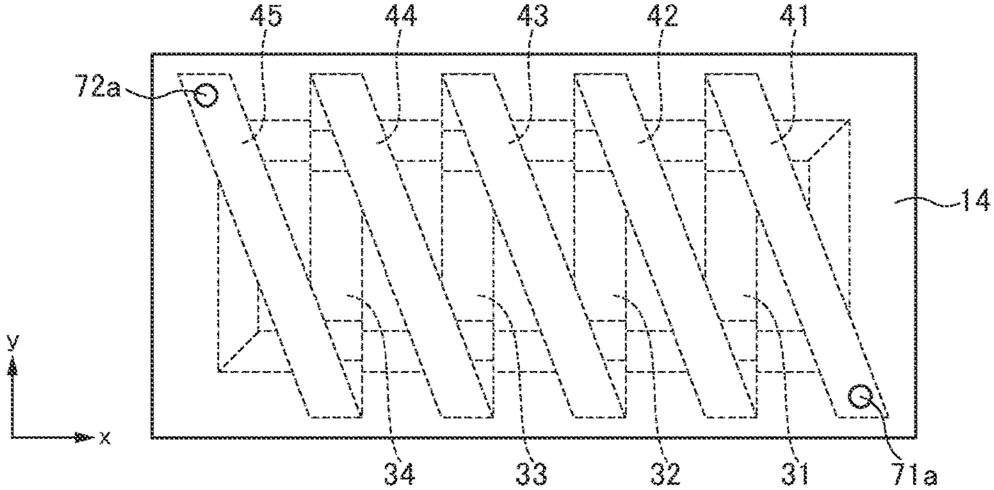
Figure 9C:
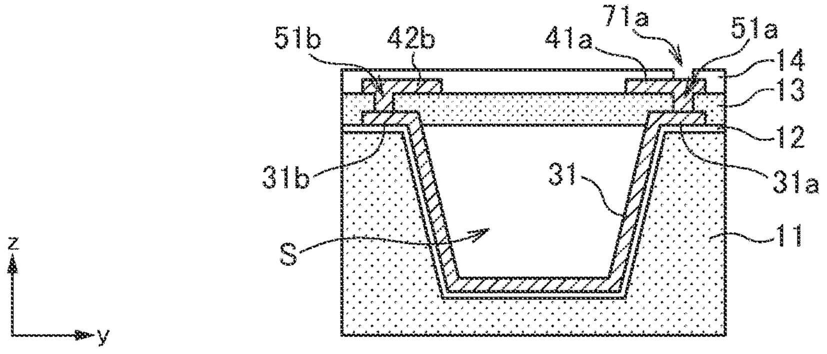

Then, as illustrated in FIGS. 9A to 9C, the insulating layer 14 is formed on the entire surface so as to embed the second sections 41 to 45 therein. As a result, the second sections 41 to 45 adjacent to one another in the x-direction are insulated from one another by a resin-based insulating material having a low relative permittivity. Then, openings 71a and 72a are formed in the insulating layer 14 to expose the other end 41b of the second section 41 and one end 45a of the second section 45 therethrough, respectively. Finally, the terminal electrodes E1 and E2 are formed so as to overlap the openings 71a and 72a, respectively, whereby the coil component 1 according to the present embodiment is completed.

As described above, in the manufacturing method for the coil component 1 according to the present embodiment, the cavity is formed in the support body 11, and after the formation of the first sections 31 to 34 on the inner wall 11a of the cavity, the insulating layer 13 is bonded so as to close the cavity, thus allowing the hollow space S to be formed inside the element body 10. This allows the coil pattern C with less floating capacitance to be embedded in the element body 10.

Second Embodiment

Figure 10A:
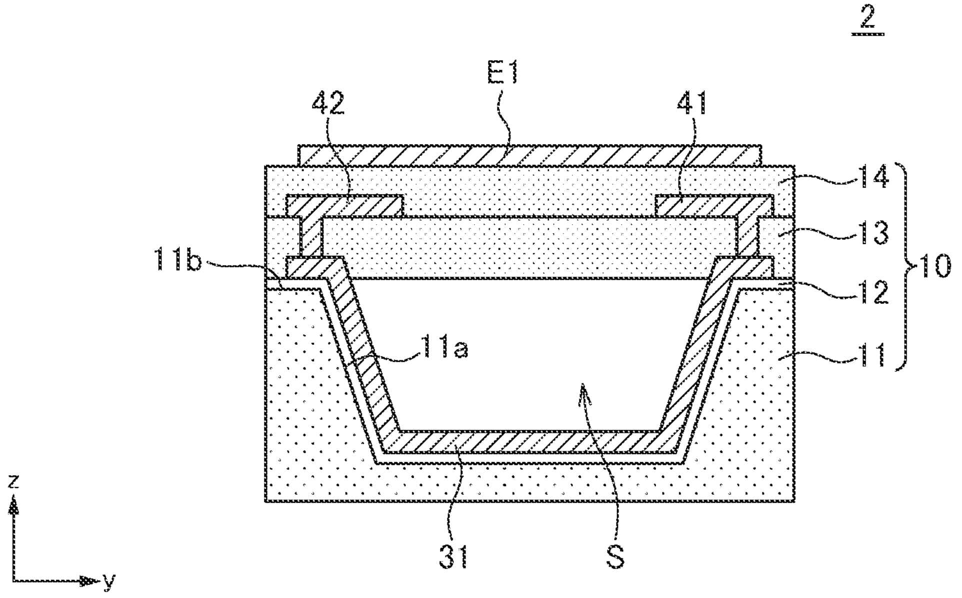
FIGS. 10A and 10B are schematic cross-sectional views for explaining the configuration of a coil component 2 according to a second embodiment of the present invention.
Figure 10B:
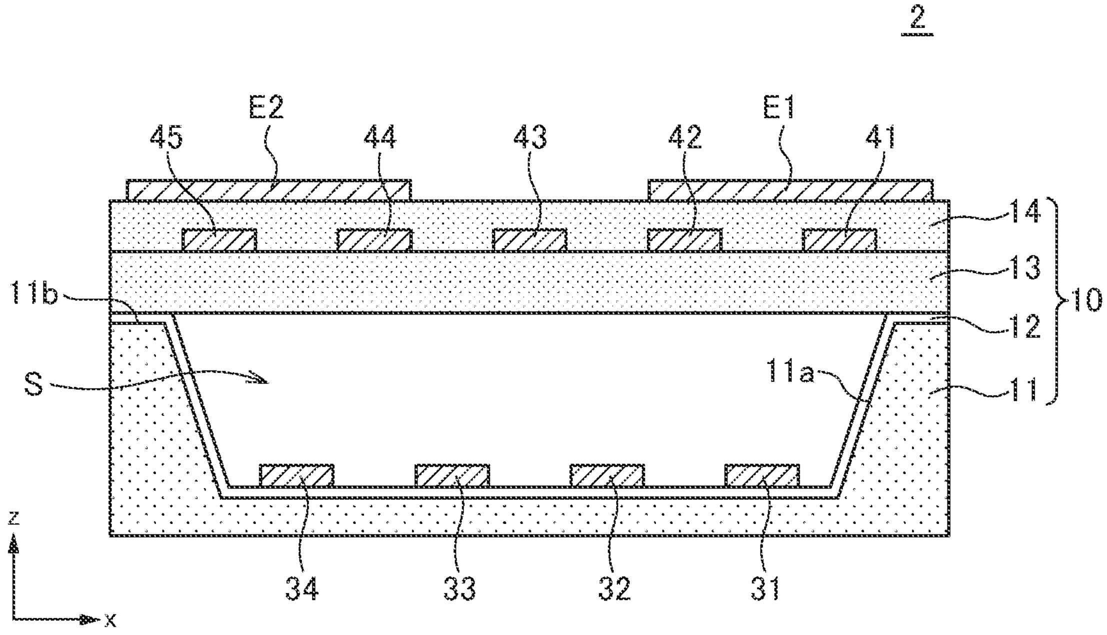

FIGS. 10A and 10B are schematic cross-sectional views for explaining the configuration of a coil component 2 according to a second embodiment of the present invention.

As illustrated in FIGS. 10A and 10B, the coil component 2 according to the second embodiment differs from the coil component 1 according to the first embodiment in that the insulating layer 14 is made of the same resin-based insulating material as that of the insulating layer 13. Other configurations are the same as those of the coil component 1 according to the first embodiment, so the same reference numerals are given to the same elements, and overlapping description will be omitted. As exemplified by the coil component 2 according to the second embodiment, the second sections 41 to 44 need not necessarily be covered with a resin-based insulating material having a low relative permittivity in the present invention.

It is apparent that the present disclosure is not limited to the above embodiments, but may be modified and changed without departing from the scope and spirit of the disclosure.

What is claimed is:

1. A coil component comprising:

an element body;

a coil pattern embedded in the element body and helically wound in a plurality of turns; and first and second terminal electrodes provided on a surface of the element body and connected respectively to one and other ends of the coil pattern, wherein the element body includes a support body having a cavity formed therein and a first insulating layer stacked on the support body so as to cover the cavity, thereby forming a hollow space inside the element body, wherein the coil pattern includes a plurality of first sections formed along an inner wall of the cavity and a plurality of second sections formed on the first insulating layer, wherein one ends of the plurality of first sections are connected respectively to their corresponding one ends of the plurality of second sections, wherein other ends of the plurality of first sections are connected respectively to their corresponding other ends of the plurality of second sections, wherein the first insulating layer is made of a resin-based insulating material, wherein the element body further includes a third insulating layer made of a resin-based insulating material and covering the first insulating layer so as to embed the plurality of second sections therein, wherein the first and second terminal electrodes are provided on the third insulating layer, and wherein the resin-based insulating material constituting the third insulating layer is lower in relative permittivity than the resin-based insulating material constituting the first insulating layer.

2. The coil component as claimed in claim 1, wherein the element body further includes a second insulating layer that covers the inner wall of the cavity, and wherein the first sections of the coil pattern are provided on the inner wall of the cavity through the second insulating layer.

3. The coil component as claimed in claim 2, wherein the support body is made of silicon.

4. The coil component as claimed in claim 1, wherein the resin-based insulating material constituting the first insulating layer is added with filler.

5. The coil component as claimed in claim 1, wherein the first and second terminal electrodes are arranged along an axial direction of the coil pattern.

6. The coil component as claimed in claim 5, wherein the first and second terminal electrodes are formed on the surface of the element body parallel to the axial direction without being formed on another surface thereof perpendicular to the axial direction.

* * * * *